United States Patent

Nishino et al.

[11] Patent Number: 6,111,842
[45] Date of Patent: Aug. 29, 2000

[54] OPTICAL HEAD

[75] Inventors: Seiji Nishino, Osaka; Hiroaki Yamamoto, Hyogo; Ken'ichi Kasazumi, Takatsuki; Shin-ichi Kadowaki, Sanda, all of Japan

[73] Assignee: Matsushita Electric Industrial Co., Ltd., Osaka, Japan

[21] Appl. No.: 09/015,367

[22] Filed: Jan. 29, 1998

[30] Foreign Application Priority Data

Jan. 29, 1997 [JP] Japan .................................. 9-014974

[51] Int. Cl.⁷ ........................................................ G11B 7/09
[52] U.S. Cl. ........................ 369/118; 369/112; 369/44.24
[58] Field of Search ............................. 369/118, 44.12, 369/44.23, 44.24, 44.25, 44.41, 44.37, 112, 109, 103

[56] References Cited

U.S. PATENT DOCUMENTS 5,798,994   8/1998   Kamatani ..................... 369/44.23 X
5,802,036   9/1998   Ohba et al. ................... 369/44.23 X Primary Examiner—Muhammad Edun
Attorney, Agent, or Firm—Ratner & Prestia

[57] ABSTRACT

An optical head has a light source for emitting a light beam; optical device for condensing the emitted light beam onto an information recording medium and condensing light reflected from the information recording medium; and aperture limitation device for, of the condensed reflected light, causing light of a predetermined outer region to exit in a position different from a position where light of an inner region exits, wherein the light of the outer region and the light of the inner region caused to exit by the aperture limitation devices are separated to different places.

36 Claims, 9 Drawing Sheets

Tracking Direction

OPTICAL HEAD

BACKGROUND OF THE INVENTION

1. Field of the Invention

The present invention relates to an optical head capable of reproduction of different kinds of information recording media, for example, reproduction of high-density optical disks (DVDs) and reproduction of compact disks (CDs).

2. Description of the Prior Art

In recent years, standards for a highly densified optical disk (hereinafter, referred to as DVD) have been announced and some of the manufactures have already commercialized the DVD. FIG. 9 shows the construction of a conventional optical system of an optical head for the DVD. In FIG. 9, a laser beam 2 emitted from a semiconductor laser 1 is reflected at a beam splitter 4 so that its direction is bent at the right angle, and is converted into a parallel beam 5 by a collimator 3. The parallel beam 5 is converged by an objective lens 7 and applied onto an information recording surface of an optical disk 8. The applied light is reflected at the optical disk 8 and is again incident on the objective lens 7, converted into the parallel beam 5 and converged by the collimator 3. The converged reflected light passes through the beam splitter 4 and is then detected by a photodetector 20.

According to the standards for the DVD, the thickness of the protection layer on the disk signal side is 0.6 mm, the wavelength of the signal reading laser is 655 nm and the NA (numerical aperture) of the reading objective lens is 0.6. These are greatly different from those of conventional CDs in which the thickness of the protection layer is 1.2 mm, the wavelength of the signal reading laser is 790 nm and the NA of the reading objective lens is 0.45. Therefore, in order to reproduce a conventional CD by use of an optical head for DVDs as shown in FIG. 9, some scheme is necessary. For this reason, various methods as described below have been proposed.

One method is to mechanically switch between an objective lens for the 1.2-mm-thick protection layer and an objective lens for the 0.6-mm-thick protection layer by use of some devices. Another method is to provide one objective lens with two focal points one for DVDs and the other for CDs like a bifocal lens. The method in which switching between two objective lenses is performed includes a method in which like an axially rotating head, two objective lenses of different kinds are disposed about a center of rotation and switching therebetween is performed by rotating them. The method in which one objective lens is provided with two focal points is an excellent method being simple in the construction of the optical system.

A still another method is to insert an aperture limitation element for both the light reaching the disk (go path) and the light reflected from the disk (return path). This method is intended to improve the quality of the CD reproduction signals, when a CD is reproduced by use of an objective lens for DVDs, by removing the light of a portion where the NA is great from both the light exiting from the objective lens and the light returning to the objective lens because reproduction signal deterioration is caused, particularly, in signals from the portion where the NA is great.

However, according to the method in which switching between two kinds of objective lenses is performed, the number of mechanical parts increases, so that the size of the optical head increases. In addition, the reliability is low because the switching between the lenses is performed by mechanical axial rotation of the lenses.

According to the method in which one objective lens is provided with two focal points, the use efficiency of the light is inferior because the light is inevitably divided into two parts. For this reason, the light quantity is insufficient for reproduction of low-reflectance RAM disks, etc. which will become important in the future.

According to the method in which the aperture limitation element is used, since aperture limitation is provided in a go and return system in which the light advances in both directions, device is necessary for removing the aperture limitation when a DVD is reproduced and inserting the aperture limitation when a CD is reproduced by some method; otherwise the aperture limitation is always inserted and as a natural consequence, it is impossible to reproduce a DVD. For this reason, the aperture limitation is formed of liquid crystal and by applying a voltage to the liquid crystal, the transmittance of the aperture limitation is changed to switch between reproduction of a DVD and reproduction of a CD. That is, the aperture limitation is equivalently removed and inserted. However, according to this method, it is necessary to provide more electric systems than before in the optical head optical system, which inevitably increases the size of the optical head.

As described above, while various methods have been considered to reproduce CDs by use of an objective lens (NA=0.6) for DVD reproduction, these conventional methods all use some scheme for both the go and return paths of the light. As mentioned previously, the heretofore contrived methods have problems such that the size of the apparatus increases, that the apparatus has a mechanical complexity and that DVD-RAM reproduction is impossible because the light quantity loss is great.

SUMMARY OF THE INVENTION

In view of the problems of the conventional optical head, an object of the present invention is to provide an optical head wherein the size of the apparatus is reduced, the apparatus has no mechanical complexity and the light quantity loss is small.

The present invention is an optical head comprising: a light source for emitting a light beam; optical device for condensing said emitted light beam onto an information recording medium and condensing light reflected from said information recording medium; and aperture limitation device for, of said condensed reflected light, causing light of a predetermined outer region to exit in a position different from a position where light of a central region exits, wherein said light of the outer region and said light of the central region caused to exit by said aperture limitation devices are separated to different places.

| | |
|---|---|
| 1 | semiconductor laser |
| 2 | laser beam |
| 3 | collimator |
| 4, 4a | beam splitter |
| 4b | half mirror |
| 5 | parallel beam |
| 7 | objective lens |
| 8 | optical disk |
| 11 | detection lens |
| 12 | outer hologram diffracted light |
| 13 | light passing through central region |
| 20 | photodetector |
| 50 | hologram |
| 51 | quarter λ wavelength plate |
| 100 | actuator |
| 501 | polarization hologram |
| 502 | aperture limitation element |

DESCRIPTION OF THE PREFERRED EMBODIMENTS

The present invention will hereinafter be described with reference to the drawings showing embodiments thereof.

Figure 3:
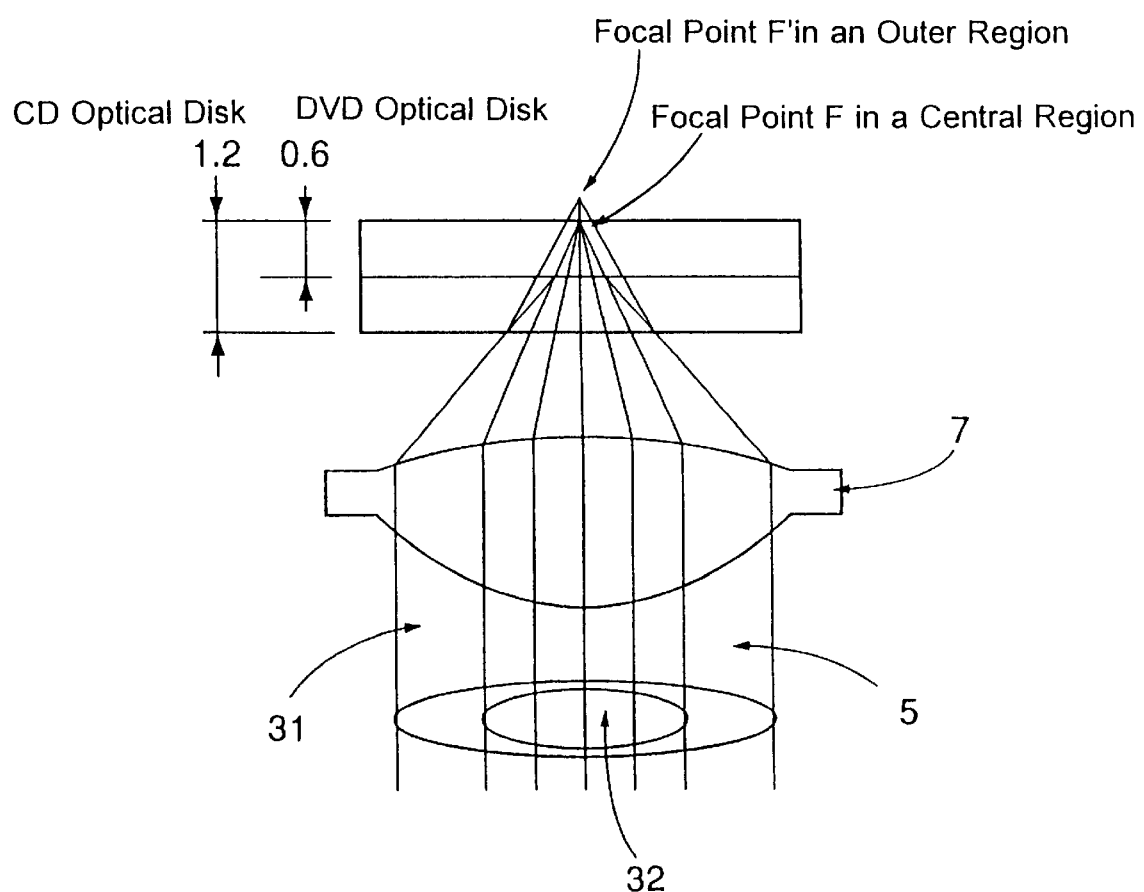
FIG. 3 is a view of assistance in explaining a principle of aperture limitation of the present invention.

FIG. 3 shows a principle of the present invention, which will be described. An objective lens 7 for DVD reproduction has an NA of 0.6 and is designed so that the light is condensed with least aberration when an optical disk with a protection layer thickness of 0.6 mm is reproduced. When a CD with a protection layer thickness of 1.2 mm is reproduced by use of the objective lens 7, the light beams incident on the disk through the outer portion of the lens (outer beam 31) form great angles with respect to the disk base plate, so that these light beams are condensed at a surface (focal point F') inner than the disk surface. However, the light passing through the central portion of the lens (inner beam 32) is condensed at a surface (focal point F) not so inner as the surface at which the outer beam 31 is condensed because the inner beam 32 has a smaller incident angle with respect to the disk base plate than the outer beam 31. Therefore, when a CD is reproduced by use of the objective lens 7 for DVD reproduction, a parallel beam 5 is not condensed at one point within the disk. When a CD is reproduced under such a condition, the reproduction signal quality of the CD is impractical.

In view of this, it is considered that when a CD is reproduced, by using only beams passing through central regions of the lens, aberration is comparatively small and signal reproduction can be easily performed. Therefore, for CD reproduction, it can be easily considered to make the signal condition excellent by performing aperture limitation. As mentioned in the description of the prior art, various such schemes have been contrived and previously, how the light is condensed on the disk has been considered important as shown in FIG. 3. Therefore, it has previously been considered that a practical apparatus cannot be obtained unless aperture limitation is inserted for the light reaching the disk (light on the go path). However, according to the results of the inventors' experiments, it has been found that it is not always necessary to insert aperture limitation on the go path to obtain sufficient characteristics. According to the experiments, it has been found that in order to obtain signal quality sufficient for CD reproduction, an NA of 0.375±0.005 is excellent when the wavelength of the reproduction laser is 655 nm. That is, sufficient characteristics are obtained by inserting aperture limitation only on the return path.

That characteristics sufficient as CD signal quality are obtained by inserting aperture limitation only on the return path device that, as is apparent from embodiments described later, the optical system may be formed without any hindrance to DVD reproduction and it is enabled to easily perform DVD-RAM reproduction expected to become commercially practical in the future while maintaining compatibility with CDs. This is because when the use efficiency of light during writing is considered, the disk reflectance of the DVD-RAM is inevitably reduced. The normal reflectance which is approximately 15% is low compared with that of the conventional ROM disk having a reflectance of 75% or higher and when RAM compatibility is considered, the present invention realizes an optical head having high versatility.

First Embodiment

Figure 1:
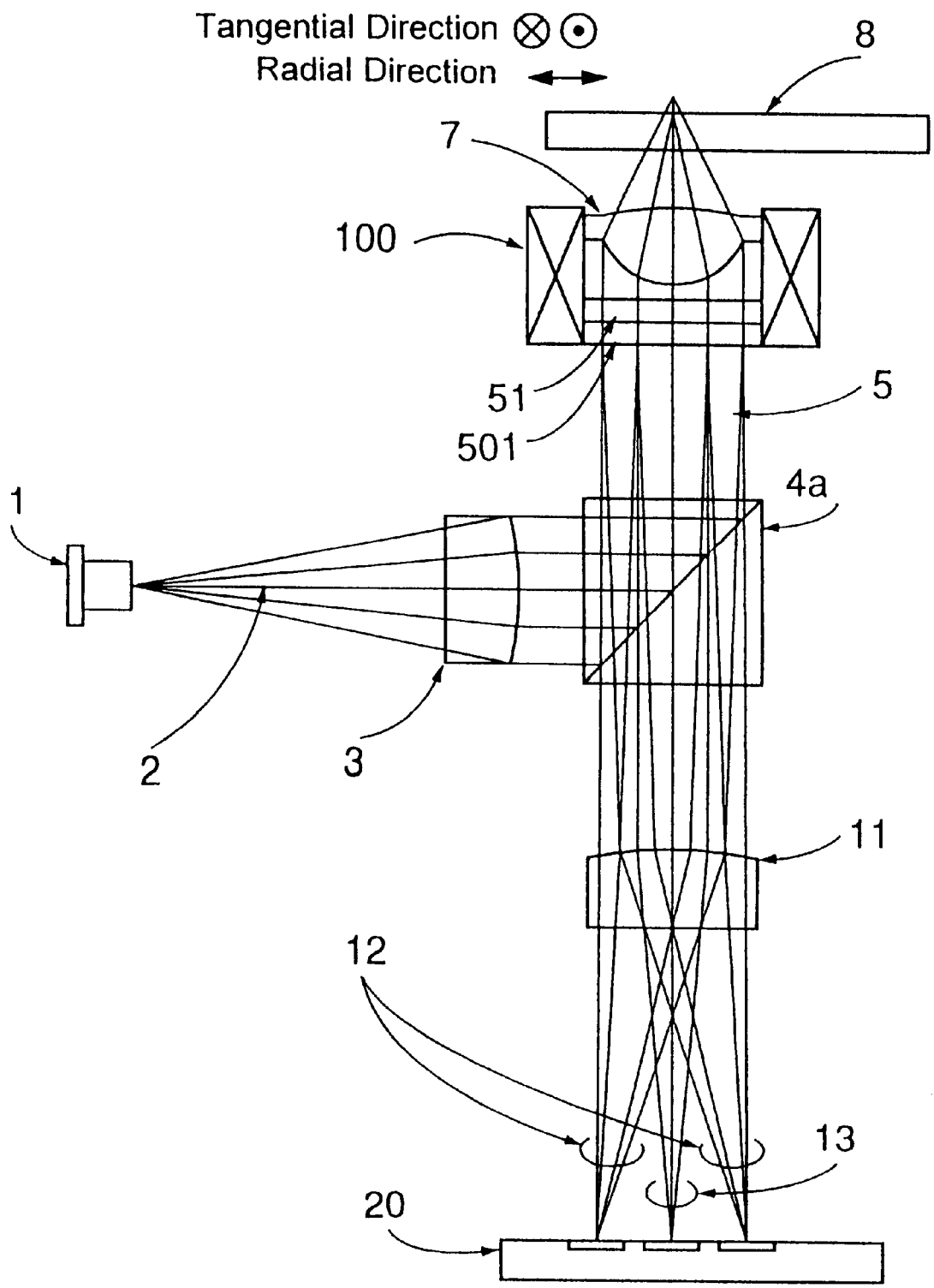
FIG. 1 shows the construction of an optical head according to a first embodiment of the present invention.

FIG. 1 shows the construction of an optical head according to a first embodiment of the present invention. In this embodiment, aperture limitation is performed by use of a polarization hologram 501. In FIG. 1, a laser beam 2 emitted from a semiconductor laser 1 serving as the light source is converted into a parallel beam 5 by a collimator 3. The parallel beam 5 is reflected at a beam splitter 4a so that its direction is bent at the right angle. The polarization direction of the polarization plane of the parallel beam 5 on the go path is one which cannot be diffracted by the polarization hologram 501 serving as the aperture limitation device. Therefore, in this case, the polarization hologram 501 does not perform any function and is equivalent to a mere glass plate. The light having passed through the polarization hologram 501 is converted into rotatory polarized light by a succeeding quarter λ wavelength plate 51. Then, the light is condensed onto an optical disk 8 serving as an information recording medium by an objective lens 7 driven by an actuator 100. The collimator 3, the beam splitter 4a, the quarter λ wavelength plate 51 and the objective lens 7 constitute optical device.

The light incident on the optical disk 8 is reflected. The light reflected from the optical disk 8 again passes through the objective lens 7 and again passes through the quarter λ wavelength plate 51. Consequently, the polarization direction of the light differs from that of the incident light by 90 degrees, so that the light is diffracted by the polarization hologram 501 at this time.

Figure 2A:
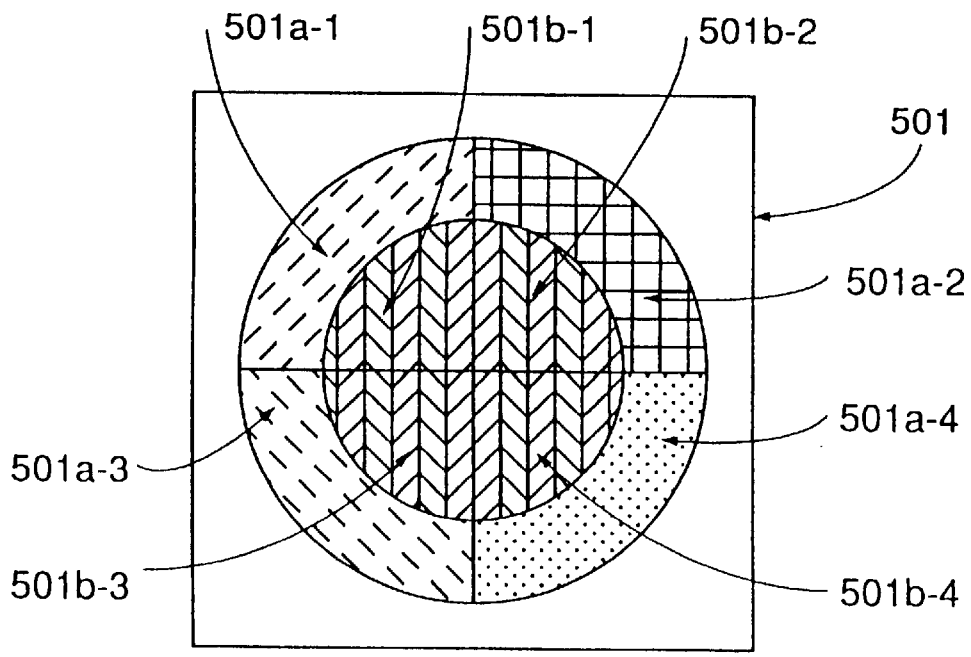
FIG. 2(a) shows the pattern of a polarization hologram element in the first embodiment.
Figure 2B:
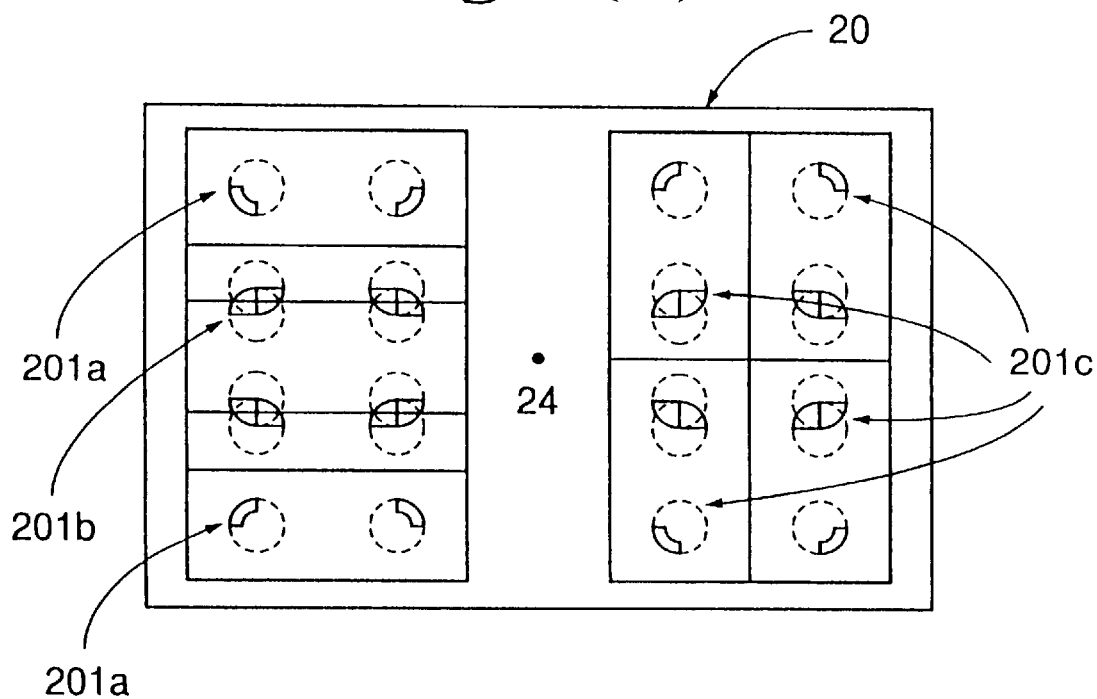
FIG. 2(b) shows a light reception pattern thereof.

The pattern of the polarization hologram 501 at this time is shown in FIG. 2(a). The polarization hologram 501 is concentrically divided into an inner region 501b-1 to 4 and an outer region 501a-1 to 4 and these regions are each subdivided into four fan-shaped regions. The diameter of the inner region is decided so as to correspond to an NA of 0.375 when the NA of the objective lens 7 is 0.6. The light incident on the outer region 501a-1 to 4 of the polarization hologram 501 is diffracted to a region 201a of a photodetector 20 shown in FIG. 2(b) and is converged. Naturally, the light beams diffracted by the polarization hologram 501 are negative diffracted beams coming out in positions symmetrical with respect to a virtual light source point 24, so that the diffration spots shown in FIG. 2(b) are all formed in positions symmetrical with respect to the virtual light source point 24. The light diffracted at the inner region 501b-1 to 4 is projected onto central portions in a region 201b of the photodetector 20 and a region 201c symmetrical with respect to the virtual light source point 24. Therefore, when an RF signal is detected by use of only the light projected onto the region 201b, since the signal is detected by use of only the light of a portion located inside the portion where the NA is 0.375, CD reproduction is performed by use of the light of only this region. For DVD reproduction, since it is necessary to use the light of all the regions, signal reproduction is performed by use of the sum of the light beams of the regions 201a, 201b and 201c. Alternatively, although the light quantity is halved, if there is no problem in noise, signal reproduction can be performed by use of the light of only the region 201c without any problem.

As described above, according to this embodiment, while aperture limitation device is disposed on the optical path where the light going to the optical disk 8 (light on the go path) and the light reflected and returning from the optical disk 8 (light on the return path) both pass, as mentioned above, by using the polarization hologram 501 as the aperture limitation device, the aperture limitation function does not work for the light on the go path but works only for the light on the return path, so that the prior art problems are solved.

Figure 5:
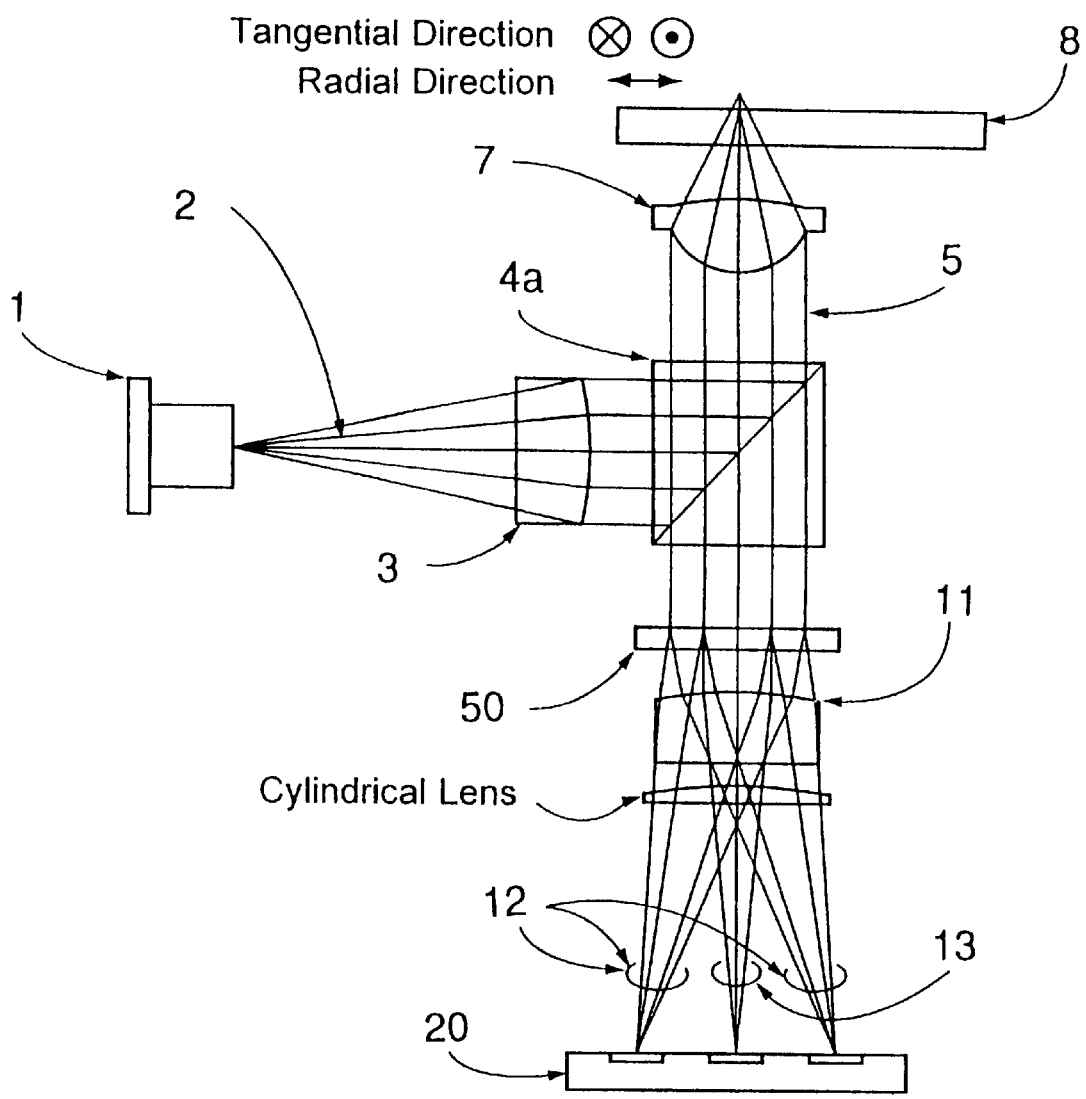
FIG. 5 shows the construction of an optical head according to a third embodiment of the present invention.

In the case of this embodiment, the aperture limitation polarization hologram 501 is fixed to the same optical barrel as the objective lens 7. This enables ideal aperture limitation because the same portion of the aperture is limited even if a lens shift due to tracking occurs for the distribution of the return light. However, although the characteristics are slightly inferior to the ideal state, the aperture limitation may be disposed on the fixed side as shown in FIG. 5 described later.

Second Embodiment

Figure 4A:
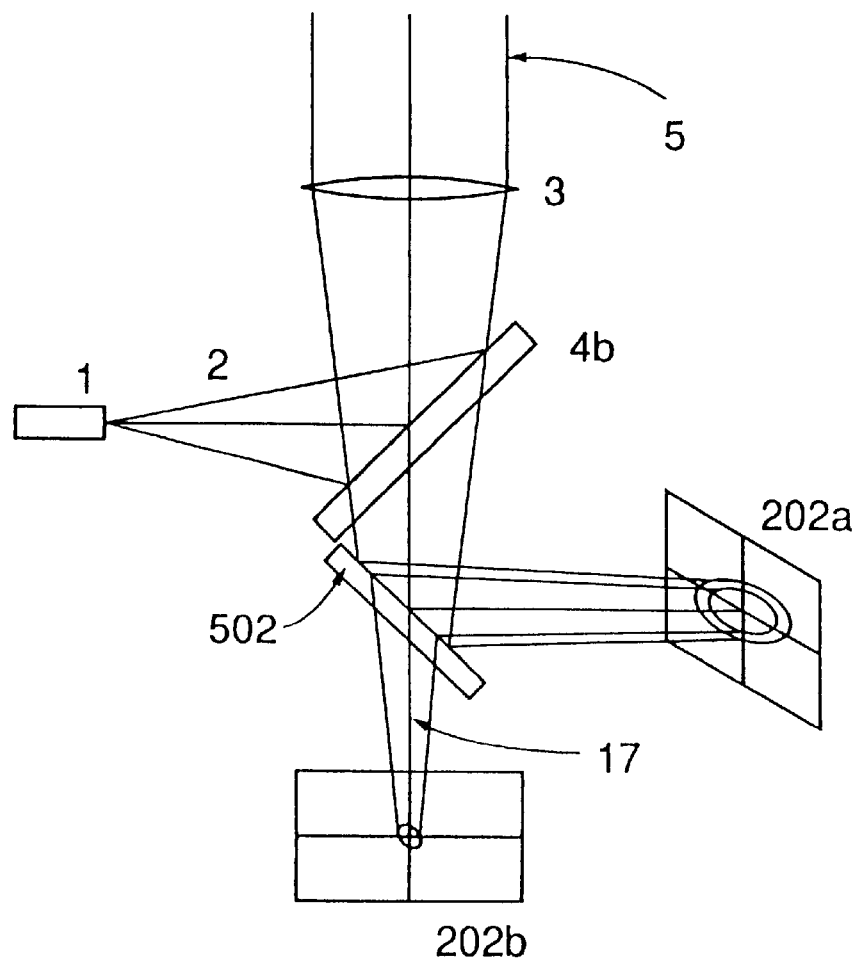
FIG. 4(a) shows the construction of an optical head according to a second embodiment of the present invention.
Figure 4B:
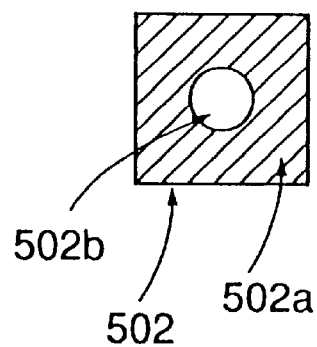
FIG. 4(b) shows an aperture limitation element thereof.
Figure 9:
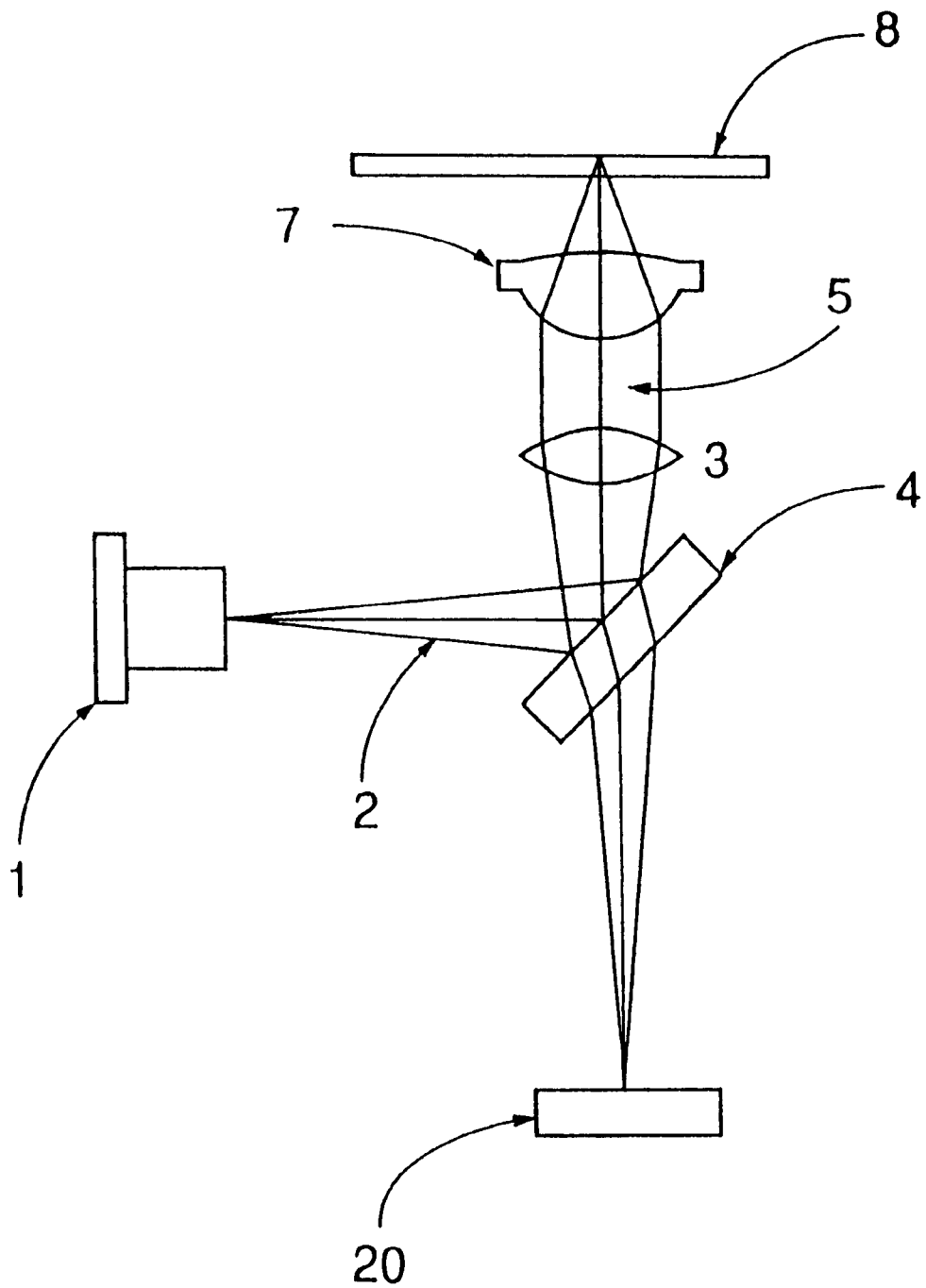
FIG. 9 shows the construction of a conventional optical system for an optical head for a DVD.

FIG. 4(a) shows the construction of an optical head according to a second embodiment of the present invention. FIG. 4(b) shows an aperture limitation element thereof. This embodiment is an example in which an aperture limitation element comprising a mirror is inserted in the optical system on the return path. In FIG. 4(a), in this optical system, reference numeral 4b represents a half mirror. A laser beam 2 emitted from a semiconductor laser 1 is reflected at the half mirror 4b so that the optical path is bent at the right angle, and is converted into a parallel beam 5 by a collimator 3. The construction of the optical system from the collimator 3 to the optical disk is similar to that of the prior art (see FIG. 9). The light reflected from the optical disk is converted into the parallel beam 5 by the objective lens and is again converted into a condensed beam by the collimator 3. Then, the light is partly reflected and partly transmitted by the half mirror 4b. As shown in FIG. 4(b), an aperture limitation element 502 is divided into an outer region 502a serving as a light reflecting portion and having an metal film formed thereon so that light is reflected, and a circular central region 502b serving as a light transmitting portion and having no metal film formed thereon so that light is transmitted. The light transmitted by the half mirror 4b is transmitted at the central region 502b of the aperture limitation element 502 and is reflected at the outer region 502a other than the central region 502b so that the optical path is bent.

Since the half mirror 4b is obliquely inserted in the condensed beam, the transmitted light of the condensed beam has astigmatism. The light reflected at the outer region 502a of the aperture limitation element 502 is received by a photodetector 202a. In the case of this embodiment, the detection area of the photodetector 202a is divided into four parts and in the case of DVD reproduction, tracking signals and information reproduction signals may be detected as well as signals of a photodetector 202b.

The light transmitted by the central region 502b of the aperture limiting element 502 is received by the photodetector 202b. The detection area of the photodetector 202b is also divided into four parts. The photodetector 202b is placed in a position where the luminous beam of the condensed beam 17 provided with astigmatism by the half mirror 4b is limited the most (position of the least circle of confusion). Therefore, CD focus signals and tracking signals may be detected by the photodetector 202b.

While in the second embodiment, the aperture limitation element (device) is designed so that the light of the central region is transmitted and the light of the outer region is reflected, it may be designed so that the light of the central region is reflected and the light of the outer region is transmitted.

Third Embodiment

Figure 6A:
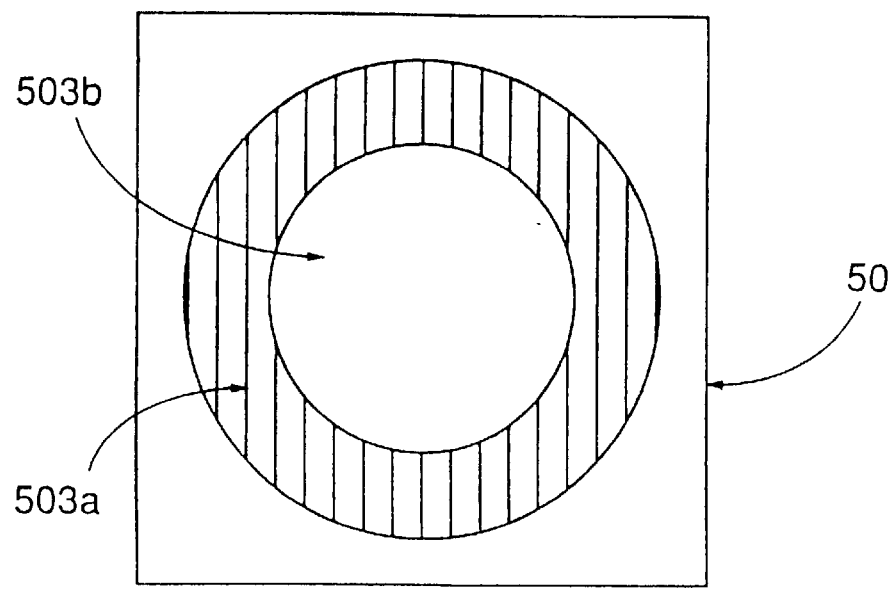
FIGS. 6(a)–(b) show divided surfaces of a hologram and a photodetector in the third embodiment.
Figure 6B:
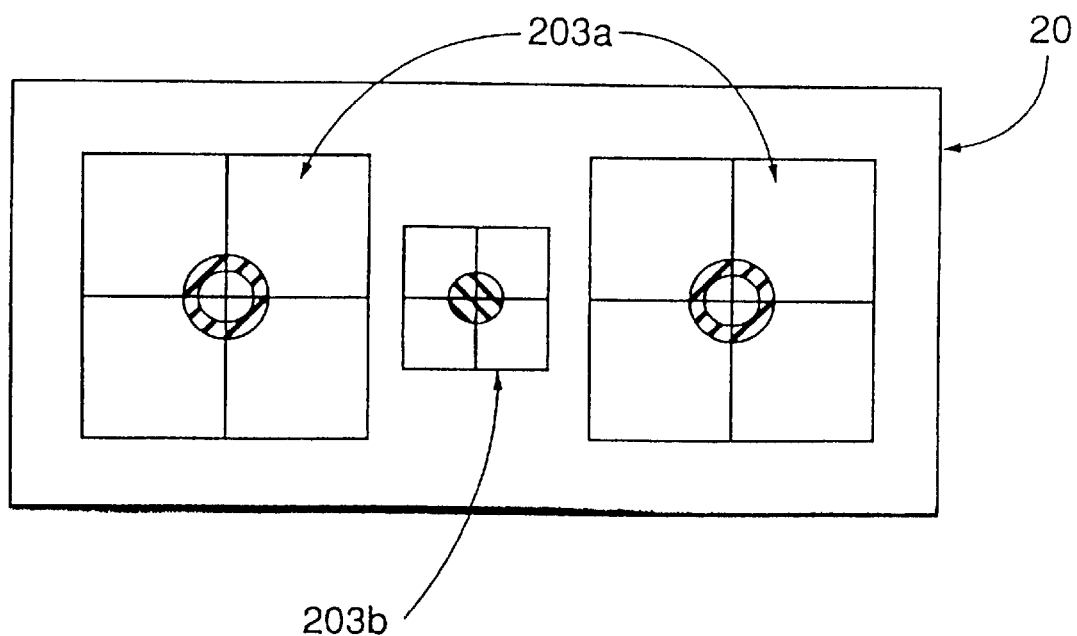

FIG. 5 shows the construction of an optical head according to a third embodiment of the present invention. FIGS. 6(a)–(b) show divided surfaces of a hologram and a photodetector in this embodiment. This embodiment is an example in which the aperture limitation that is realized with a mirror in the second embodiment is realized with a hologram. In the case of the optical head optical system of FIG. 5, since the aperture limitation device is not inserted in a position where the light on the go path and the light on the return path simultaneously pass like in the first embodiment (FIG. 1) but a hologram 50 serving as the aperture limitation device is inserted in a position where only the light passes which is on the return path after the light has been split into the light on the go path and the light on the return pass by a beam splitter 4a, any one of a glass hologram and a polarizing hologram may be used as the hologram 50. As shown in FIG. 6(a), the hologram 50 of this embodiment is concentrically divided into a central region 503b and an outer region 503a. Of the light reflected at the optical disk 8 and having passed through the objective lens 7 and the beam splitter 4a, the light diffracted at the central region 503b of the hologram 50 is condensed at the region 203b of a photodetector 20 and the light diffracted at the outer region 503a is condensed at the region 203a of the photodetector 20. The regions 203a and 203b of the photodetector 20 are each subdivided into four parts. The focus signal is produced from the four-part divided light of the region 203b. The tracking signal and the RF signal are produced from the sum of the light beams of the regions 203a and 203b.

Fourth Embodiment

Figure 7A:
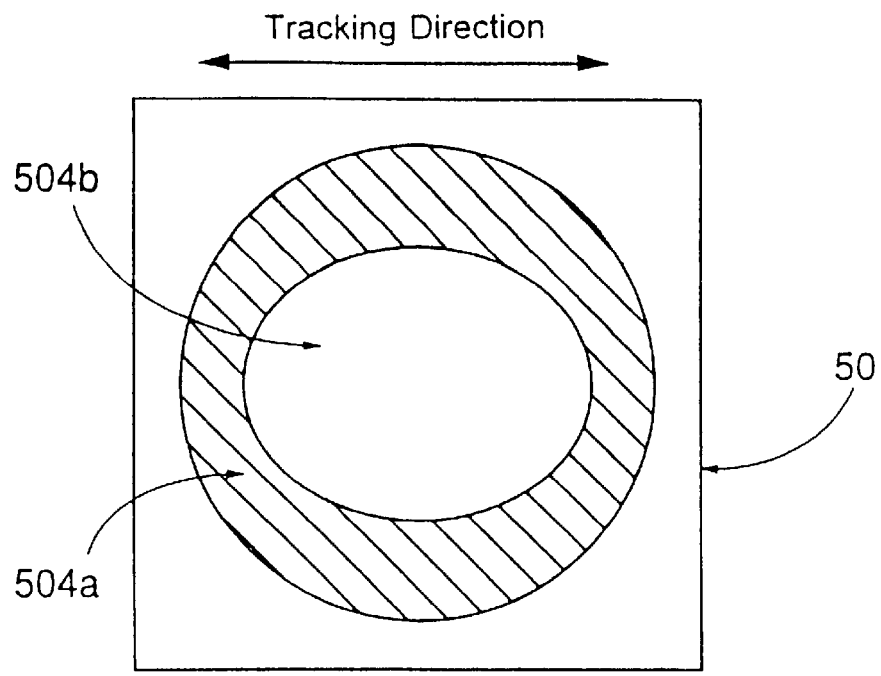
FIGS. 7(a)–(b) show divided surfaces of a hologram and a photodetector in a fourth embodiment of the present invention.
Figure 7B:
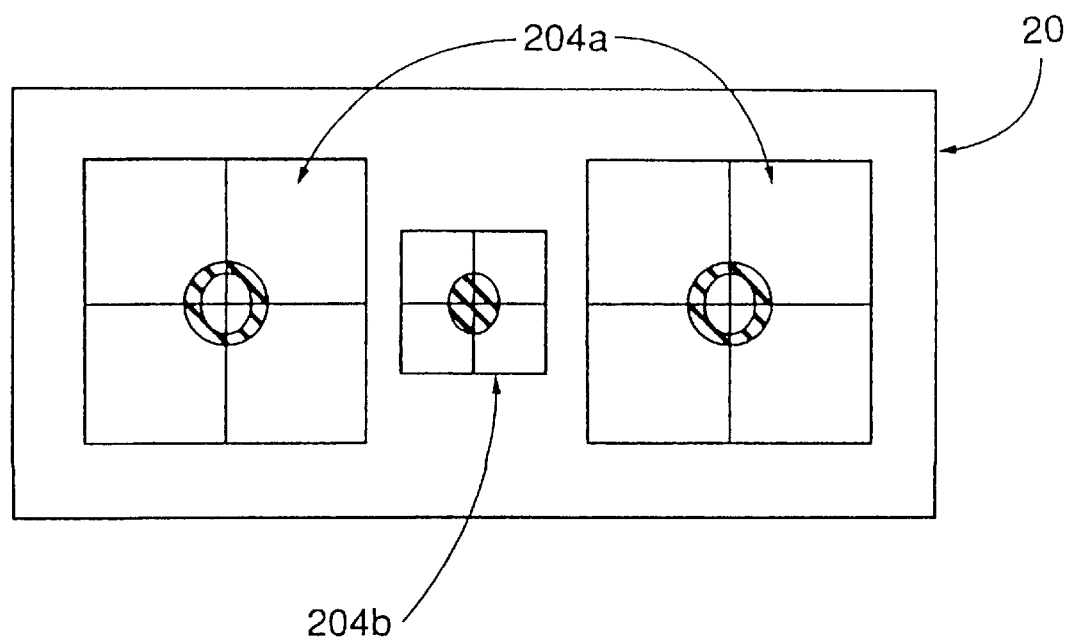

FIGS. 7(a)–(b) show divided surfaces of a hologram and a photodetector in a fourth embodiment of the present invention. The basic construction of this embodiment is similar to that of the third embodiment shown in FIG. 5. That is, a hologram 50 is inserted in a position where only the light passes which is on the return path after the light has been split into the light on the go path and the light on the return pass by a beam splitter 4a. As shown in FIG. 7(a), an outer region 504a of the hologram 50 corresponds to a region 204a of a photodetector 20 and the central region 504b of the hologram 50 corresponds to a region 204b of the photodetector 20.

This embodiment is different from the third embodiment in that the central region 504b of the hologram 50 is not circular but oval as shown in FIG. 7(a). Consequently, tracking is performed so that the objective lens 7 always runs on a reproduction signal groove and therefore, when the hologram 50 is placed in the position shown in FIG. 5, the light reflected from the optical disk 8 moves on the hologram 50 as the objective lens 7 moves. Therefore, consideration is given so that the moving portion is not subject to the aperture limitation. Consequently, the light passing through the central region 504b of the hologram 50 and condensed at the region 204b of the photodetector 20 is also oval.

Fifth Embodiment

Figure 8A:
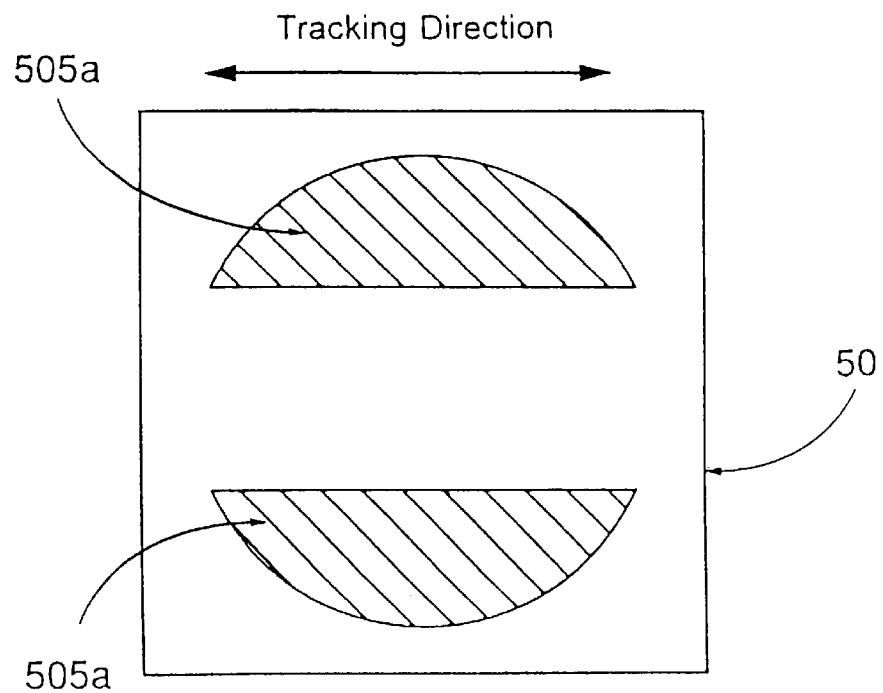
FIGS. 8(a)–(b) show divided surfaces of a hologram and a photodetector in a fifth embodiment of the present invention.
Figure 8B:
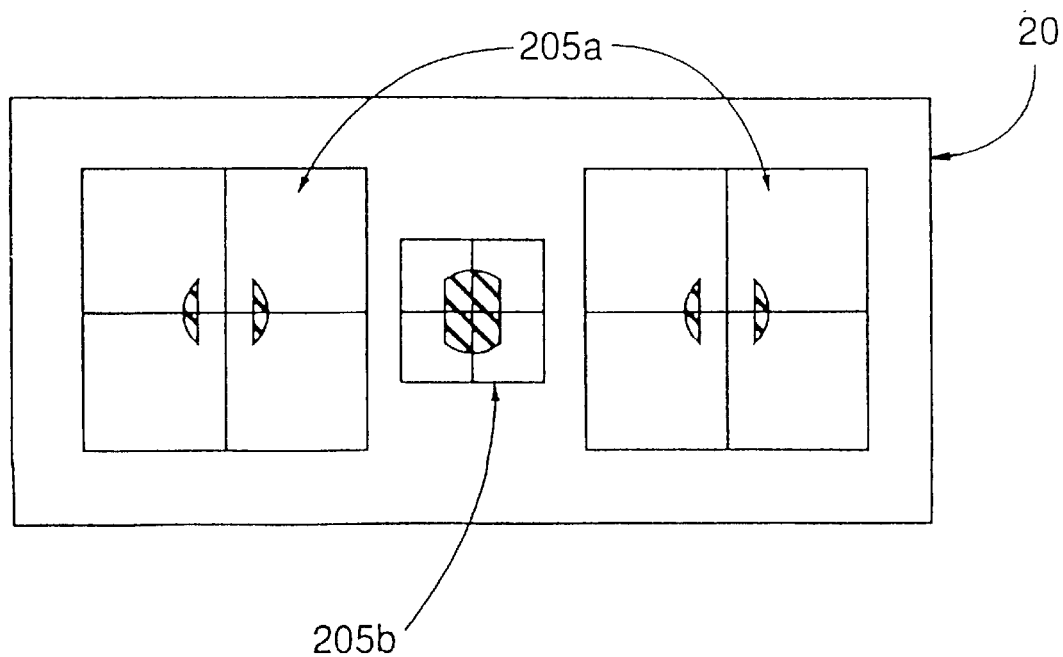

FIGS. 8(a)–(b) show divided surfaces of a hologram and a photodetector in a fifth embodiment of the present invention. The basic construction of this embodiment is similar to that of the third embodiment shown in FIG. 5. That is, a hologram 50 is inserted in a position where only the light passes which is on the return path after the light has been split into the light on the go path and the light on the return pass by a beam splitter 4a.

This embodiment is different from the third embodiment in that, in order that the aperture limitation is not performed only in the tracking direction, the shape of the aperture limitation region of the fourth embodiment is further changed, i.e. an outer region 505a of the hologram 50 is of a shape such that as shown in FIG. 8(a), a central portion between two parallel chords is cut away from a circle. Therefore, the central portion of the hologram 50 corresponds to a region 205b of a photodetector 20 and an outer region 505a of the hologram 50 corresponds to a region 205a of the photodetector 20. The light passing through the central portion of the hologram 50 and condensed at the region 205b of the photodetector 20 and the light passing through the outer region 505a of the hologram 50 and condensed at the region 205a of the photodetector 20 are of shapes corresponding to the shapes of the regions of the hologram 50.

As described above, according to the present invention, DVD-and-CD compatibility is enabled by inserting aperture limitation only in the optical system on the return path without any scheme being provided in the optical system on the go path.

While in the above-described embodiments, the photodetector 20 comprises one detector having a detection region for detecting the light passing through the central region and a detection region for detecting the light passing through the outer region, instead thereof, separate light receiving elements may be provided for detecting the light beams passing through the regions, for example, as shown in FIG. 4.

While bilaterally symmetrical light receiving portions are disposed in the above-described embodiments, only one of them is necessarily provided if there is no problem in the light quantity.

As is apparent from the above description, since the present invention has aperture limitation device for, of light condensed by optical device, causing light of a predetermined outer region to exit in a position different from a position where light of a central region exits and a photodetector for detecting the light of the outer region and the light of the central region caused to exit by the aperture limitation device, advantages are produced that the size of the apparatus is reduced, that the apparatus has no mechanical complexity and that the light quantity loss is small.

What is claimed is:

1. An optical head comprising:
a light source for emitting a light beam;
an optical device for focusing said emitted light beam in an optical go path onto an information recording medium and focusing light reflected from said information recording medium in an optical return path; and
an aperture limitation device inserted in the optical go path and in the optical return path for (1) passing the emitted light beam in the go path to the information recording medium without modification and (2) causing the reflected light in the return path to focus on a predetermined outer region of said aperture limitation device and on an inner region of said aperture limitation device,
wherein said reflected light focused on the outer region and said reflected light focused on the inner region are caused to exit by said aperture limitation device and are separated to different places.

2. An optical head according to claim 1, wherein a tracking signal is produced when a total light quantity distribution of said reflected light focused by said optical device is maintained, and a focus signal is produced only from said reflected light focused on the inner region caused to exit by said aperture limitation device.

3. An optical head according to claim 2, wherein said aperture limitation device comprises a polarization hologram and is disposed in a position in said optical device where said light incident on the information recording medium and said light reflected from the information recording medium both pass.

4. An optical head according to claim 3, wherein said predetermined outer region does not include an outer region of said reflected light in a tracking direction.

5. An optical head according to claim 4, wherein said photodetector comprises a plurality of light receiving elements.

6. An optical head according to claim 3, wherein said photodetector comprises a plurality of light receiving elements.

7. An optical head according to claim 2, wherein said aperture limitation device comprises a hologram and is disposed in a position in said optical device where only said light reflected from the information recording medium passes.

8. An optical head according to claim 7, wherein said predetermined outer region does not include an outer region of said reflected light in a tracking direction.

9. An optical head according to claim 8, wherein said photodetector comprises a plurality of light receiving elements.

10. An optical head according to claim 7, wherein said photodetector comprises a plurality of light receiving elements.

11. An optical head according to claim 2, wherein said aperture limitation device comprises: a light reflecting portion for reflecting said light of the predetermined outer region or said light of the inner region of said reflected light condensed by said optical device; and a light transmitting portion for transmitting said light of the inner region or said light of the predetermined outer region of said condensed reflected light, said aperture limitation device being disposed in a position in said optical device where only said light reflected from said information recording medium passes.

12. An optical head according to claim 11, wherein said predetermined outer region does not include an outer region of said reflected light in a tracking direction.

13. An optical head according to claim 12, wherein said photodetector comprises a plurality of light receiving elements.

14. An optical head according to claim 11, wherein said photodetector comprises a plurality of light receiving elements.

15. An optical head according to claims 2, wherein said predetermined outer region does not include an outer region of said reflected light in a tracking direction.

16. An optical head according to claim 15, wherein said photodetector comprises a plurality of light receiving elements.

17. An optical head according to claim 2, wherein said photodetector comprises a plurality of light receiving elements.

18. An optical head according to claim 1, wherein said aperture limitation device comprises a polarization hologram and is disposed in a position in said optical device where said light incident on the information recording medium and said light reflected from the information recording medium both pass.

19. An optical head according to claim 18, wherein said predetermined outer region does not include an outer region of said reflected light in a tracking direction.

20. An optical head according to claim 19, wherein said photodetector comprises a plurality of light receiving elements.

21. An optical head according to claim 18, wherein said photodetector comprises a plurality of light receiving elements.

22. An optical head according to claim 1, wherein said aperture limitation device comprises a hologram and is disposed in a position in said optical device where only said light reflected from the information recording medium passes.

23. An optical head according to claim 22, wherein said predetermined outer region does not include an outer region of said reflected light in a tracking direction.

24. An optical head according to claim 23, wherein said photodetector comprises a plurality of light receiving elements.

25. An optical head according to claim 22, wherein said photodetector comprises a plurality of light receiving elements.

26. An optical head according to claim 1, wherein said aperture limitation device comprises: a light reflecting portion for reflecting said light of the predetermined outer region or said light of the inner region of said reflected light condensed by said optical device; and a light transmitting portion for transmitting said light of the inner region or said light of the predetermined outer region of said condensed reflected light, said aperture limitation device being disposed in a position in said optical device where only said light reflected from said information recording medium passes.

27. An optical head according to claim 26, wherein said predetermined outer region does not include an outer region of said reflected light in a tracking direction.

28. An optical head according to claim 27, wherein said photodetector comprises a plurality of light receiving elements.

29. An optical head according to claim 26, wherein said photodetector comprises a plurality of light receiving elements.

30. An optical head according to claim 1, wherein said predetermined outer region does not include an outer region of said reflected light in a tracking direction.

31. An optical head according to claim 30, wherein said photodetector comprises a plurality of light receiving elements.

32. An optical head according to claim 1, wherein said photodetector comprises a plurality of light receiving elements.

33. An optical head comprising:
a light source for emitting a light beam;
an optical device having a single focal point for focusing said emitted light beam in a go path onto an information recording medium and focusing light reflected from said information recording medium in a return path; and
an aperture limitation device inserted in the go path and the return path for, respectively, passing said emitted light in the go path without modification and for directing said focused reflected light in the return path into separated directions.

34. An optical head comprising:
a light source for emitting a light beam;
an optical device for (1) focusing said emitted light beam in an optical go path onto an information recording medium and (2) focusing light reflected from said information recording medium in an optical return path onto (1) a predetermined inner region and onto (2) a predetermined outer region of an aperture limitation device; and
said aperture limitation device for (1) directing said outer region focused reflected light to a first position, (2) directing said inner region focused reflected light to a second position different from the first position, and (3) directing the emitted light in the optical go path to the information recording medium without modification.

35. A method for reproducing information from an information recording medium comprising the steps of:
(a) emitting a light beam from a light source;
(b) focusing the emitted light beam in a go path onto the information recording medium from an aperture limitation device without modifying the emitted light beam;
(c) focusing light reflected from said information recording medium in a return path onto an inner region and onto an outer region of the aperture limitation device;
(d) directing light focused onto the inner region of the aperture limitation device to a first position; and
(e) directing light focused onto the outer region of the aperture limitation device to a second position different from the first position.

36. The method of claim 35 in which step (c) includes varying the intensity of the focused reflected light in the inner or outer regions as a function of the thickness of the information recording medium.

* * * * *